Sept. 6, 1960     S. W. SWEET ET AL     2,951,745
LIQUID PROPORTIONING PUMP SYSTEM
Filed March 21, 1958
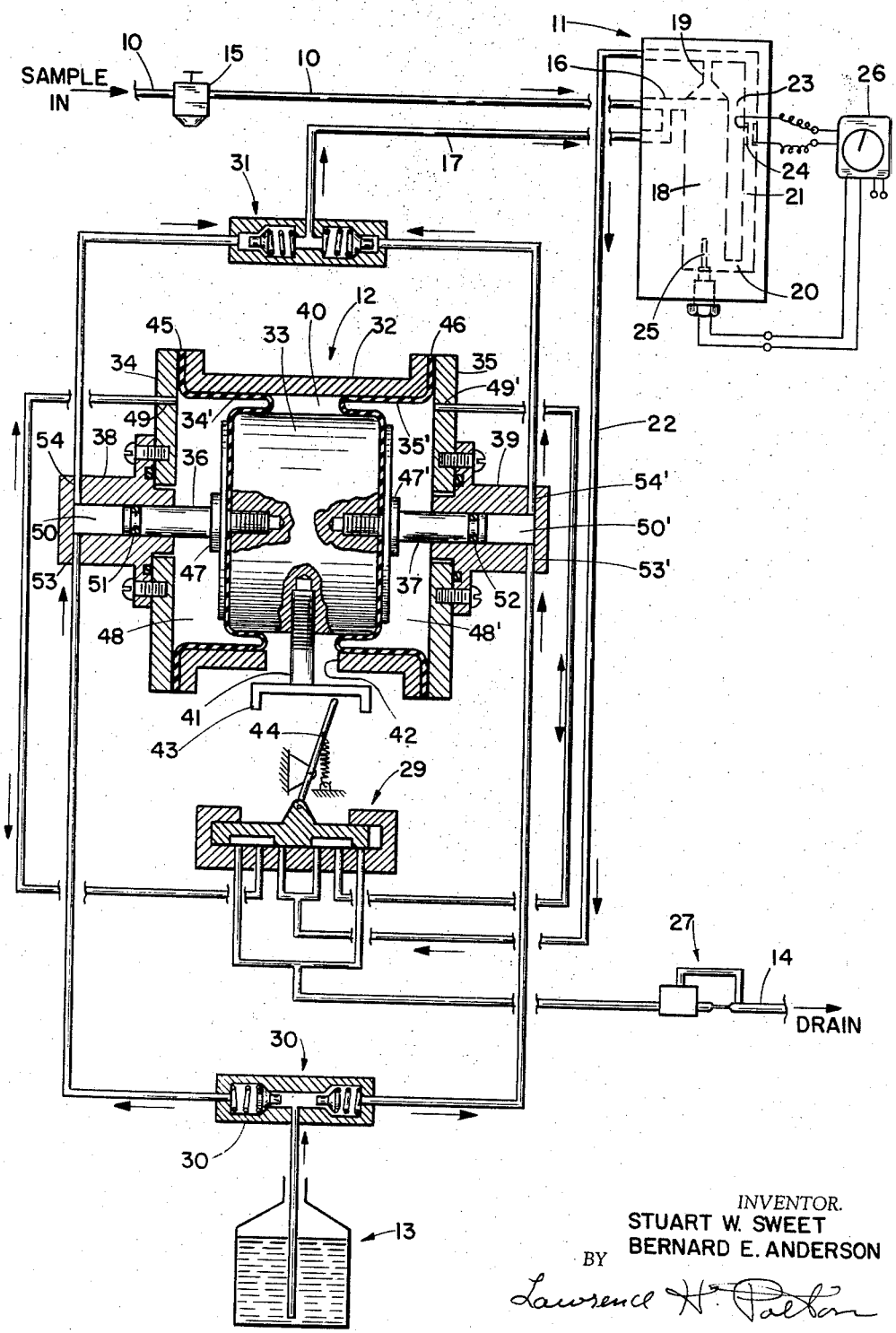
INVENTOR.
STUART W. SWEET
BERNARD E. ANDERSON
BY
Lawrence H. Patton
AGENT ated Sept. 6, 1960

2,951,745
LIQUID PROPORTIONING PUMP SYSTEM

Stuart W. Sweet, Mansfield, and Bernard E. Anderson, North Attleboro, Mass., assignors to The Foxboro Company, Foxboro, Mass., a corporation of Massachusetts Filed Mar. 21, 1958, Ser. No. 722,985

1 Claim. (Cl. 23—253)

This invention relates to liquid proportioning systems and has particular reference to a pump system for pumping a pair of liquids on a proportional basis.

As an example, this invention relates to an electrochemical measurement system wherein a reagent is added to a sample liquid on a controlled proportional basis, and an electro-chemical measurement is thereafter made with respect to the resultant liquid. A specific example of this type of system is a system for measurement of residual chlorine in water.

Modern requirements for exactitude in the control of chemical compositions with respect to the percentage composition of the various components is demanding, and the liquid proportioning pump system according to this invention is a substantial step in the direction of bettering such control.

This invention is accomplished at least in part by means of a pair of double chamber units, back to back, comprising four variable volume chambers without stuffing box arrangements, wherein liquid applied to one chamber in one of the pair of doubles causes a precise volume of another liquid to be drawn into the other chamber of the same one of the pair of doubles. An advantage of this invention is that bubbles are kept to a minimum in the liquid volume measuring portions of the pumping system.

It is, therefore, an object of this invention to provide a new and improved liquid proportioning system, based on a liquid pumping action.

Other objects and advantages of this invention will be in part apparent and in part pointed out hereinafter.

The drawing is a general schematic showing of an overall system embodying this invention, with sectional detail of some portions thereof.

As an illustrative embodiment of this invention, the drawing illustrates a system for measuring residual chlorine in water. The general process involves the influx of chlorinated water, mixing a measured amount of liquid reagent such as potassium iodide with the chlorinated water, temporarily freeing a portion of the mixture of bubbles, and performing an electro-chemical measurement on the bubble-free mixture. The general system for accomplishing this process is a liquid pumping system which proportions the relative flow of chlorinated water and liquid reagent.

The system in the drawing includes a sample (chlorinated water) input pipe 10, and a cell 11 which is an arrangement of a mixing chamber, bubble trap, and electro-chemical measurement housing. The system further includes a pump arrangement 12 with a reagent source 13 associated therewith and a system outlet 14, leading from the cell 11 by way of the pump arrangement 12.

The input 10 is a liquid conduit with a filter 15 therein, and the conduit leads directly to a mixing point 16 in the cell 11. The mixing point 16 is simply a juncture of two liquid conduits, one of which is the pipe 10 and the other which is a pipe 17 leading from the pump arrangement 12 and provided for carrying reagent liquid from the pump arrangement 12 to be mixed with the chlorinated water input through the pipe 10 at the mixing junction 16.

In the cell 11, a vertically disposed chamber 18 is provided with an entrance thereto from the pipe junction point 16 near the top of the chamber 18. Above the mixing pipe entrance point, the chamber 18 tapers conically upwardly and inwardly to terminate in a relatively small outlet 19 at the topmost point of the chamber 18. Below the entrance of the pipe from the mixing point 16, the chamber 18 extends downward a substantial distance and has a bottom outlet extending to one side as at 20. The outlet 20 is thereafter extended upwardly as at 21 and then back horizontally to join the outlet 19 from the top of the chamber 18. The outlet from the cell 11 is a continuance 22 from this point and leads to the pumping arrangement 12 as a means of providing operating force to the pump itself.

Again in the cell 11, the arrangement of the chamber 18 is such that bubbles float upwardly and the mixture in the outlet portions 20 and 21 is free from bubbles. Therefore, electro-chemical measurement electrodes 23 and 24 are provided in the outlet passage portion 21. A temperature bulb 25 is provided and extends into the bottom portion of the chamber 18. A suitable conventional recording instrument 26 receives electrical connections from the electrodes 23 and 24, and from the temperature bulb 25 as a temperature compensation device. Thus, the instrument 26 provides amperometric measurement, that is, an electro-chemical measurement with a temperature compensation arrangement, and this measurement is accomplished in a bubble-free portion of the system.

The general operation of the pump arrangement 12 is that the liquid, which is a combination of sample and reagent as the output from the cell 11 through a pipe 22, is used to move the pump first in one direction and then in the opposite direction according to automatic mechanical switching arrangements to be described hereinafter. In the course of this movement, reagent is drawn on a suction basis from the reagent source 13 up into the pump system and thereafter, when the pump direction changes, the reagent is pushed out of the pump and into the reagent outlet pipe 17 which leads to the mixing point 16 as the joining arrangement of the chlorinated water and the reagent.

The sample water is carried directly to the measuring cell in the shortest possible distance from the actual taking of the sample from the process line (not shown). The proportioning is accomplished by arranging a conventional flow controller 27 in the overall system outlet 14 and by providing calculated dimensional arrangements in the pump system 12. Thus, for a given system, the liquid flow at any point is a constant. The liquid mixing is accomplished by forcing reagent into the sample stream at the mixing point 16.

In any given system, there are three different constant flows, that is, volume per unit time, and each one is constant. From the mixing point 16 through the cell 11, and through the pump arrangement 12 to the outlet 14, there is a constant flow of the combination of chlorinated water and reagent. In the sample pipe 10 up to the mixing point 16, there is a constant flow somewhat less than that of the mixture. Thirdly, there is a constant flow from the reagent source 13 up through the pump arrangement 12 and through the reagent outlet 17 to the mixing point 16. This flow is also different from the other two and is usually relatively small since the proportion of chlorinated water to reagent may be of the order of 100 to 1.

Accordingly, the sample chlorinated water is supplied to the mixing point through a fixed volume conduit 10 at a constant rate, and the reagent is supplied to the mixing point through the pumping system at a constant rate and in a proportion determined by the relative pumping chamber proportions in the pump arrangement 12.

The pumping arrangement 12 is operated by the combined sample and reagent liquid and has, as its output to the mixing point, reagent only, in a calculated and controlling proportion with respect to the incoming sample through the pipe 10.

Associated with the main pump assembly 12, is a toggle valve assembly 29 operated mechanically by the pump as described hereinafter, an inlet check valve assembly 30 for the reagent, and an outlet check valve assembly 31 for the reagent. The check valves are operated by the liquid flow.

The pump itself, indicated generally at 12, comprises a generally cylindrical housing 32 with a piston-like member 33 therein. The piston 33 is movable back and forth horizontally within the housing 32 to provide the pumping action of this device. The inside of the housing is a horizontally disposed cylinder with end walls as at 34 and 35. The piston member 33 has mounted thereon a pair of horizontal end shafts 36 and 37 which are centrally located in the end faces of the piston member 33, and which extend into sleeve units 38 and 39 mounted on the end faces 34 and 35 of the horizontal housing.

The piston member 33 is movable back and forth horizontally in sleeve openings in the sleeve units 38 and 39 in the pumping action. The piston 33 has a substantial clearance as indicated at 40 with respect to the inner walls of the housing 32 wherein the inner wall is a cylindrical sleeve and the piston 33 is cylindrical in form as well. The piston 33 may be moved back and forth within the housing and carries with it an outwardly extending arm 41 which extends through the housing wall 32 by means of a slot opening 42 in one side thereof. The outer end of the arm 41 is a long flat downwardly facing U-shaped member 43 which at each end of its stroke, occasioned by the lateral movements of the piston 33, contacts and moves a lever arm 44, which is a spring mounted, snap acting operating lever for the toggle valve 29.

Within the pump housing 32, a "hat" bellows is mounted on each end of piston 33, as at 34', 35'. Each hat bellows has an annular outer peripheral portion clamped onto one end of the housing 32 as indicated at 45 and 46 in a complete annular mounting arrangement. These bellows, which are formed of limp fabric, then extend inwardly along the inner wall of the housing 32 past the respective adjacent end faces of the piston 33 and into the clearance 40 between the piston 33 and the inner wall of the housing 32. The bellows thereafter are turned back on themselves and their central portions over lie the end faces of the piston 33 and are respectively clamped thereon, each by a suitable disc and nut as indicated at 47, 47'. With this arrangement, a variable volume chamber 48 is provided at one end of the inside of the pump housing and a similar variable volume chamber 48' is formed at the other end of the inside of the pump housing 32.

A single access passage is provided at the top of each of these chambers 48 and 48', these passages being at 49 and 49' respectively, and each provides both inlet and outlet for liquid to pass to and from the respective variable volume chambers 48 and 48'. On the one hand, incoming liquid will fill the chamber 48 and push the piston member 33 to the right of the drawing, thus pushing out any liquid which is in the chamber 48' through the passage 49' which is acting in this case as an outlet. Then when the chamber 48 has been filled to the desired amount, the U member 43 contacts switch operating lever 44 and shifts the valving arrangement in the toggle valve 29 so that the pump operating liquid is no longer being forced into chamber 48 but is instead being forced into chamber 48'. The valving arrangement is such that the passage 49 of the chamber 48 is now an outlet and the piston 33 is moved to the left in the drawing to eject liquid from the chamber 48.

It should be noted in this connection that in liquid systems of this nature, the formation of bubbles by gas liberation or expansion or in other ways presents a problem in that such bubbles tend to build up inside the pump. In a device wherein the pump is essentially metering out measured volumes of liquid, bubble formations can cause errors in the amount of liquids measured and metered out and might even so block up the pump as to not pump out liquid at all but just have a bubble block therein. As a means to obviate this difficulty, the passages 49 and 49' are located in this invention at the top of the chambers 48 and 48', and such bubbles as do exist float upward and collect near the top so that when the liquid is ejected from the chamber 48, the bubbles essentially completely go with it.

Thus, the variable volume chambers 48 and 48' are provided for receiving and being operated by, in alternation, the liquid mixture of chlorinated water and reagent.

Other variable volume chambers are also provided; one in association with each of the chambers 48 and 48'. These variable volume chambers are indicated at 50 and 50' each being located respectively in the sleeve housings 38 and 39 on opposite ends of the pump unit. The variable volume chambers 50 and 50' are defined in part by the sleeves which receive the supporting and guiding shafts 36 and 37 which are assembled with the central piston 33. At the outer ends of the shafts 36 and 37, suitable O ring units 51 and 52 are mounted in sealing relation with the inner walls of the openings 50 and 50' in the manner of piston rings in an automobile piston and ring assembly.

As the main piston member 33 is moved to one side or the other by the application of the combination of chlorinated water and reagent liquid to one or the other of the chambers 48 or 48', the chambers 50 and 50' also change in volume. For example, if a liquid is applied to the chamber 48 to push the main piston 33 to the right, then the chamber 50 is enlarged and provides a suction effect which draws in reagent from the reagent fluid source 13. When the device is switched over and the main piston 33 reverses direction, the reagent in the chamber 50 is pushed out and reagent is thereafter sucked into the opposite chamber 50'.

With respect to the variable volume chambers 50 and 50', two liquid conduit connections are provided for each, one at the bottom of the chamber and one at the top of the chamber, both being at the outer ends of the chamber. These openings are designated at 53, 54, and 53' and 54'.

When reagent liquid is sucked into the chamber 50, it is drawn in through opening 53 as an inlet, and when it is pushed out of the chamber 50, it is pushed out through opening 54 as an outlet. Similarly, on the opposite side, 53' is an inlet and 54' is an outlet. These inlets and outlets are brought into operation by the operation of the inlet and outlet check valve assemblies 30 and 31 which are actuated by the flow of liquid therethrough according to its direction.

The top and bottom opposite location of the inlet and outlet passages 53 and 54 for the chamber 50 is a device for avoiding the trapping of, and getting rid of, bubbles in the chamber 50. When the reagent is drawn into the chamber 50, any bubbles therein tend to rise to the top, although some may be large enough to stick to the end of the piston shaft 36 since the chamber 50 is relatively small in diameter. With this separate inlet and outlet arrangement, particularly with the arrangement of the outlet 54 at the top of the chamber 50, any bubbles in the reagent tend to be, and are, pushed to the outer end of the chamber 50 and then drawn up through the outlet passage 54 by the output flow from the chamber 50. Thus, bubbles are not allowed to stick in or build up in quantity in the chamber 50, and a bubble effect on the volume of liquid in the chamber 50 is maintained at a minimum.

Similarly, in the opposite arrangement, bubbles may come into the chamber 50' through the inlet 53', but they are thereafter pushed out or drawn out by the flow through the outlet passage 54'.

The operation of this overall system is accordingly as follows: It is started up by applying a sample liquid to the pipe 10. As an example, this liquid may be chlorinated water. This start-up sample liquid enters the cell 11, passes the mixing point 16, and enters the mixing and bubble chamber 18, thereafter passing through the outlet passages 20 and 21 and to some extent the outlet passage 19 from the bubble chamber 18, the whole then proceeding from the cell 11 through pipe 22 to the toggle valve 29.

As shown, the toggle valve 29 is arranged so that the cell outlet pipe 22 is connected therethrough to the right side of the pump 28 and through the passage 49' to the variable volume chamber 48'. Thus, the chlorinated water from the sample line 10, in this start-up action, moves the piston 33 from right to left in the drawing. In so doing, it draws up reagent from the source 13 through the check valve unit 30 and to the right of the pump assembly and into the chamber 50' through the inlet passage 53'. This suction force closes the reagent outlet 54' in the check valve unit 31.

While the piston 33 is thus being pushed to the left in this start-up action, air is being pushed out of the left hand pump chamber 48 through the toggle valve 29 to drain, and out of the left hand pump chamber 50 through the check valve 31 and into the cell 11. The inlet pipe 53 to the chamber 50 is closed off in the check valve unit 30 by the outgoing pressure from the chamber 50. The initial air in the system is soon purged therefrom through the drain 14.

When the piston 33 reaches a predetermined end point in its travel to the left, it trips the toggle switch arm 44 to change the connections through the toggle valve 29. This action shifts the connection of the pipe 22 through the toggle valve 29 from the right side of the pump to the left side of the pump, and the liquid from the pipe 22 then enters the pump chamber 48 through the passage 49 to tend to push the piston member 33 now to the right. This causes reagent to be drawn into chamber 50 through its inlet 53.

Under these new conditions, the toggle valve 29 connection arrangement is such that the right hand pump chamber 48' has its passage 49' connected now as an outlet through the toggle valve 29 and through the flow controller 27 to drain through the pipe 14. Also, through the operation of the check valve units 30 and 31, as actuated by the flow of liquid, the reagent chamber 50' now has its inlet passage 53' closed in the inlet check valve unit 30 and its outlet passage 54' open through the outlet check valve unit 31.

As the piston 33 is thus moved to the right, the reagent is forced out of the chamber 50' through the check valve 31 and to the mixing point 16 in the cell 11. From this point on in the operation of the pump, there is a mixture in the system, that is, the chlorinated water in the pipe 10 and the reagent in the pipe 17 being mixed at the mixing point 16 and passed through the cell 11. Thereafter also, it is this mixture which operates the pump, that is, entering the chambers 48 and 48' in alternation to move the pump back and forth to alternately draw in and discharge reagent in the chambers 50 and 50' to provide a steady stream of reagent through the check valve unit 31 on one side or the other into the pipe 17 and to the mixing point 16.

Thus, with a particular mechanical assembly, after the initial air is purged from the system, a steady state liquid system is provided wherein the flows are maintained constant by the flow controller 27.

In the pump housing 32, the relative size of the piston areas, that is, the end faces of the piston 33 and the outer end faces of the shafts 36 and 37 establish the ratio in this proportioning device. The combination of this ratio with the setting of the flow controller 27 and the fixed flow arrangements of the overall system establishes the amount of reagent which is put into the output 17 from the pump system to the mixing point 16 and, therefore, establishes a percentage of reagent in the mixture after the mixing point 16. All of this proportioning arrangement is done with respect to the reagent, and the result is applied to the incoming sample of chlorinated water in the pipe 10 under a fixed volume pipe condition so that the proportion of reagent to chlorinated water in the mixture after the mixing point 16 is controlled through the system by controlling the reagent. The sample liquid is entered as the remaining percentage after the reagent percentage is established.

If desired, a series arrangement of several pump systems according to this invention may be established to provide very small percentage liquid combinations.

This invention, therefore, provides a new and improved liquid proportioning pump system.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

We claim:

A liquid pump unit for use in a system wherein a sample liquid is mixed with a second liquid by means of said pump unit which travels the second liquid from a source to the mixing point, and wherein the pump unit is operated entirely by the mixed combination of the sample liquid and the second liquid, and wherein the system includes a sample liquid inlet pipe, a second liquid pipe, a mixing junction between said pipes, and a measurement device downstream of said mixing junction, said pump unit being located downstream of said measurement device and automatically powered entirely by the mixture of said sample liquid and said second liquid as said mixture leaves said measurement device, said pump unit comprising, in combination, a main body large diameter horizontally disposed cylindrical sleeve, a pair of centrally apertured circular end plates closing off said sleeve, a pair of boss units mounted in the central apertures of said end plates and providing outwardly extending axial bosses in the form of outer end closed small diameter horizontally disposed cylindrical sleeves which open into said main body sleeve, a piston assembly comprising a large diameter piston in said main body sleeve, a pair of axially extending small diameter pistons axially threaded into said large piston and lying in said small diameter sleeves as bearings supports for said large piston, with said piston assembly movable horizontally and axially of said pump, with such portions of said small pistons as are in or capable of being moved into said main body sleeve having a uniform, sliding fit diameter with respect to its associated small sleeve, a "hat" bellows mounted on each end of said large piston to define, with said end plate units, a large diameter chamber at each end of said main body sleeve, a side wall lengthwise slot through main body sleeve at a point horizontally between said "hat" bellows, a switch pin mounted on the side of said large piston and extending through said side wall slot, a two-position fluid-flow multiple switch snap unit outside of said main body and operable by said switch pin as said piston assembly is moved axially along said sleeves, a liquid input pipe to said switch unit from said measurement device, a single liquid input-outlet pipe from said switch unit to the outer end top portion of one of said large diameter chambers, a single liquid input-outlet pipe from said switch unit to the outer end top portion of the other of said large diameter chambers, a drain from said switch unit, and liquid connection passages in said switch unit for simultaneously directing input flow from said input pipe to one of said large diameter chambers and output flow from the other of said large diameter chambers to said drain and for reversing such connections according to the position of said snap switch unit, a flow system for said second liquid, said flow system comprising an inlet pipe, an inlet check valve unit for sequentially passing said second liquid to said small diameter pump sleeves through equal length pipes according to suction established therein by the action of said large diameter piston in moving said small diameter pistons, said flow system further comprising bottom outer end inlets to said small sleeves, equal length top outer end outlets from said small sleeves, and an outlet check valve unit for sequentially passing the output flow from said small sleeves and their outlets according to said pump action, said snap switch unit, said outlet check valve unit, being located substantial distances in said flow system from their respectively associated pump sleeves and all said outlets being clear of traverse, bubble-catching obstruction therebetween, whereby the system is free of bubble-trapping surfaces for substantial distances in the outlets to the various pump sleeves, and whereby the output of said outlet check valve is available to complete the associated system by travel through said second liquid pipe to said mixing junction.

References Cited in the file of this patent

UNITED STATES PATENTS

| | | |
|---|---|---|
| 2,218,393 | Corydon | Oct. 15, 1940 |
| 2,349,150 | Falasconi | May 16, 1944 |
| 2,445,985 | Werner | July 27, 1948 |
| 2,702,023 | Seeloff | Feb. 15, 1955 |
| 2,711,137 | Moller | June 21, 1955 |
| 2,797,149 | Skeggs | June 25, 1957 |
| 2,803,260 | Wells | Aug. 20, 1957 |
| 2,820,434 | Otto | Jan. 21, 1958 |